US008697994B2

(12) United States Patent
Masaka

(10) Patent No.: US 8,697,994 B2
(45) Date of Patent: Apr. 15, 2014

(54) WIRING HOLDING MEMBER, ELECTRONIC DEVICE AND IMAGE FORMING APPARATUS

(75) Inventor: Masaki Masaka, Saitama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 206 days.

(21) Appl. No.: 12/841,695

(22) Filed: Jul. 22, 2010

(65) Prior Publication Data

US 2011/0048792 A1 Mar. 3, 2011

(30) Foreign Application Priority Data

Aug. 25, 2009 (JP) ................................ 2009-194527

(51) Int. Cl.
*H02G 3/04* (2006.01)

(52) U.S. Cl.
USPC ........ 174/72 A; 174/68.1; 174/38.3; 174/480; 174/99 R; 361/826; 248/244

(58) Field of Classification Search
USPC ............. 174/72 A, 68.1, 68.3, 480, 99 R, 36; 361/826; 248/244; 52/749.1
See application file for complete search history.

(56) References Cited

U.S. PATENT DOCUMENTS 3,777,223 A * 12/1973 Chandler et al. .............. 361/823
3,968,322 A * 7/1976 Taylor ......................... 174/72 A
4,051,383 A * 9/1977 Dola ............................... 307/11
4,640,314 A * 2/1987 Mock ............................ 138/162
4,874,908 A * 10/1989 Johansson ................... 174/72 A
5,463,189 A * 10/1995 Deneke et al. ............ 174/138 G
5,877,451 A * 3/1999 Zimmerman ................ 174/68.3
6,113,435 A * 9/2000 Anderson et al. ............. 439/687
6,124,548 A * 9/2000 Suzuki et al. ............... 174/72 A
6,711,031 B1 * 3/2004 Jelinger ........................ 361/807
7,855,872 B2 * 12/2010 Rasmussen et al. .......... 361/627
7,956,286 B2 * 6/2011 Furuichi ......................... 174/69
2006/0185888 A1 8/2006 Yamada et al.

FOREIGN PATENT DOCUMENTS

JP 62-052975 A 3/1987
JP 2002-240393 A 8/2002
JP 3444528 B2 9/2003
JP 2005-218187 A 8/2005
JP 2006-238557 A 9/2006
JP 2007-273663 A 10/2007

OTHER PUBLICATIONS

Communication from the Japanese Patent Office dated May 14, 2013, in a counterpart application No. 2009-194527.

* cited by examiner

*Primary Examiner* — Dhirubhai R Patel
(74) *Attorney, Agent, or Firm* — Sughrue Mion, PLLC

(57) ABSTRACT

A wiring holding member includes a holding portion and a wiring holding space. The holding portion is formed in a laying direction of a wiring including a linear wiring and a band-shaped wiring, and holds the band-shaped wiring. The wiring holding space is formed by the band-shaped wiring held in the holding portion, and accommodates the linear wiring therein.

2 Claims, 10 Drawing Sheets

WIRING HOLDING MEMBER, ELECTRONIC DEVICE AND IMAGE FORMING APPARATUS

CROSS-REFERENCE TO RELATED APPLICATION

This application is based on and claims priority under 35 USC 119 from Japanese Patent Application No. 2009-194527 filed on Aug. 25, 2009.

BACKGROUND

Technical Field

The present invention relates to a wiring holding member, an electronic device and an image forming apparatus.

SUMMARY

According to an aspect of the invention, a wiring holding member includes a holding portion and a wiring holding space. The holding portion is formed in a laying direction of a wiring including a linear wiring and a band-shaped wiring, and holds the band-shaped wiring. The wiring holding space is formed by the band-shaped wiring held in the holding portion, and accommodates the linear wiring therein.

BRIEF DESCRIPTION OF THE DRAWINGS

Exemplary embodiments of the invention will be described in detail based on the following figures, wherein.

DETAILED DESCRIPTION

Figure 1:
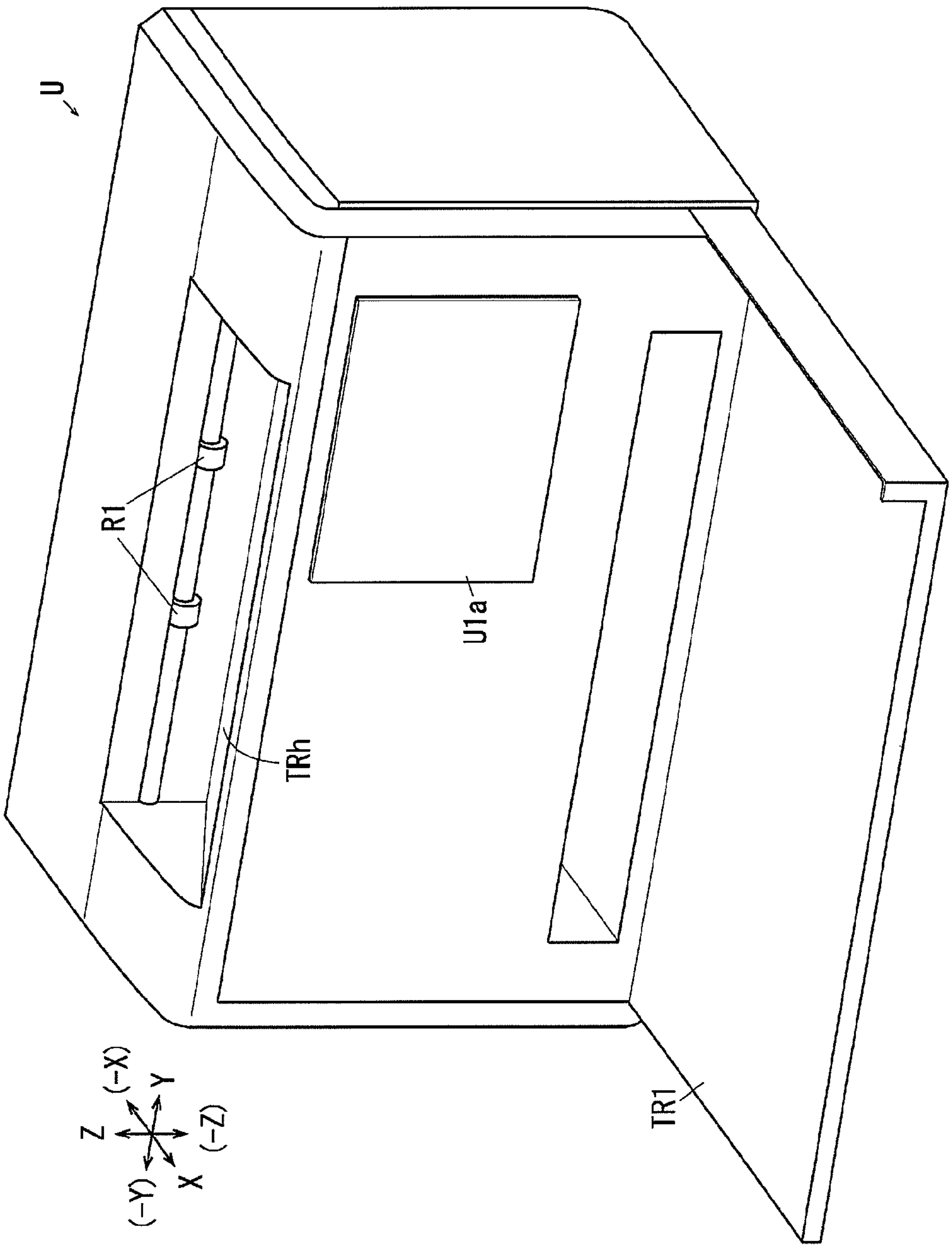
FIG. 1 is a perspective view showing an image forming apparatus according to a first example.

Next, specific examples (hereinafter referred to as examples) of an embodiment according to the invention will be described with reference to the drawings, and the invention is not restricted to the following examples.

For easy understanding of the following description, in the drawings, a longitudinal direction is set to be an X-axis direction, a transverse direction is set to be a Y-axis direction, a vertical direction is set to be a Z-axis direction, and directions or sides indicated as arrows X, −X, Y, −Y, Z and −Z are set to be forward, rearward, rightward, leftward, upward and downward directions or front, rear, right, left, upper and lower sides, respectively.

In the drawings, moreover, it is assumed that a circle having "·" described therein implies an arrow turned from a back side of a paper toward a right side thereof, and a circle having "x" described therein implies an arrow turned from the right side of the paper to the back side thereof.

In the following description using the drawings, an illustration of members other than necessary members for explanation will be properly omitted for easy understanding.

FIG. 1 is a perspective view showing an image forming apparatus according to a first example.

In FIG. 1, in a printer U according to an example of an image forming apparatus in accordance with a first example, that is, an example of an electronic device, a paper feeding tray TR1 according to an example of a paper feeding portion for accommodating a recording sheet S according to an example of a medium is provided in a lower part of a front surface. Moreover, an upper surface of the printer U is provided with a discharging tray TRh according to an example of a discharging portion for discharging the recording sheet S having an image recorded thereon. Furthermore, a right part of the front surface is provided with a front cover U1 a according to an example of an opening/closing portion to be opened/closed when a toner cartridge according to an example of a developer housing container is to be operated.

Figure 2:
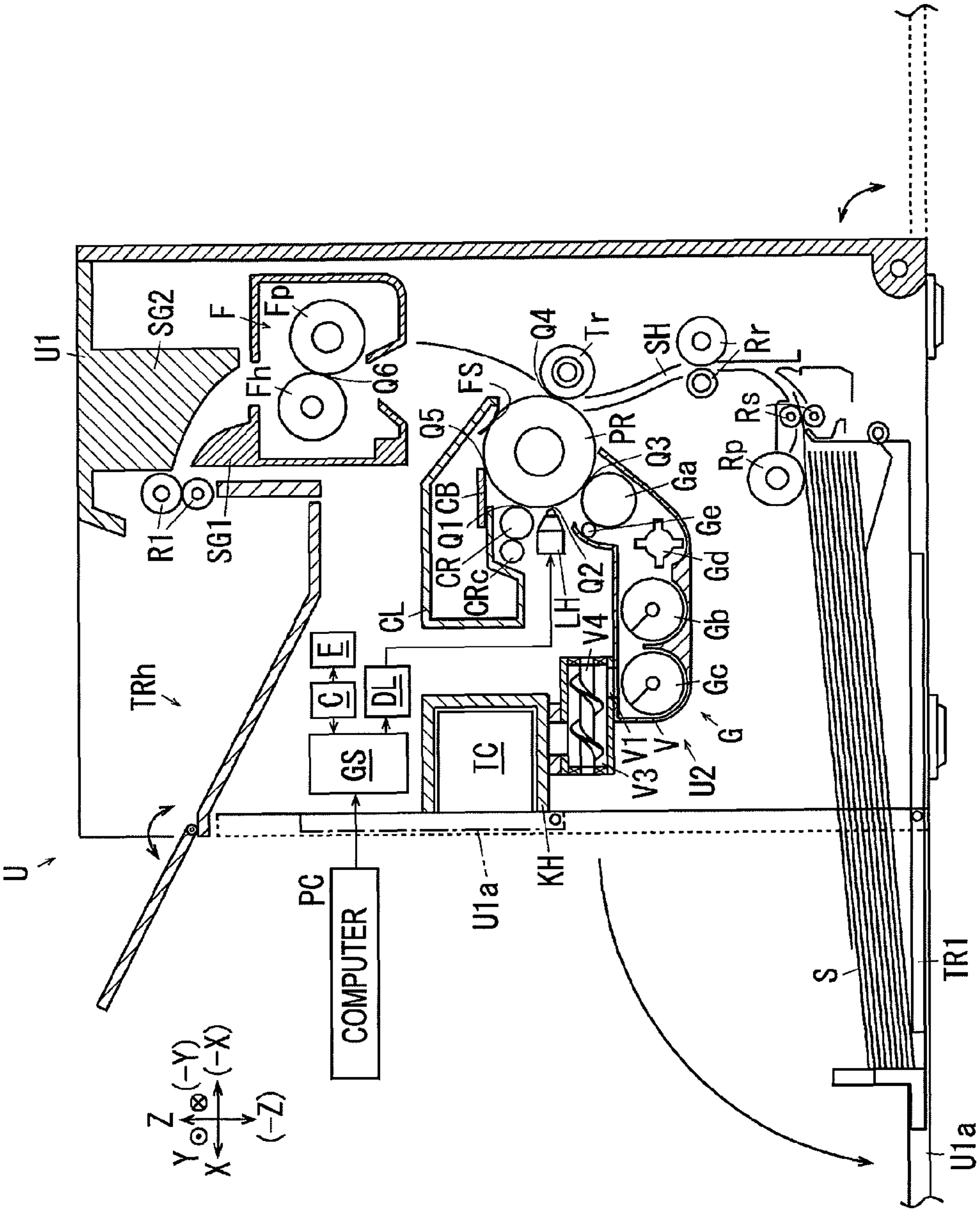
FIG. 2 is an explanatory view showing the whole image forming apparatus according to the first example.

FIG. 2 is an explanatory view showing the whole image forming apparatus according to the first example.

In FIG. 2, the printer U includes a controller C according to an example of a first electronic circuit, that is, an example of a control portion, an image processing portion GS of which operation is controlled by the controller C, a laser driving circuit DL according to an example of a latent image forming circuit, and a power device E. The power device E applies a voltage to a charging roll CR according to an example of a charger, a developing roller Ga according to an example of a developing member, and a transfer roller Tr according to an example of a transfer member.

The image processing portion GS converts print information input from a computer PC according to an example of an external information transmitting device into image information for latent image formation, and outputs the image information to the laser driving circuit DL at a preset time, that is, in a preset timing. The laser driving circuit DL outputs a driving signal to a latent image forming device LH depending on the image information thus input. The latent image forming device LH according to the first example is constituted by a device in which an LED according to an example of a latent image writing element is disposed linearly at a preset interval in a transverse direction, that is, an LED head.

A photosensitive member PR according to an example of an image holding member to be rotated and driven is supported on a rear part of the printer U. The charging roll CR, the latent image forming device LH, a developing device G, the transfer roll Tr and a photosensitive cleaner CL according to an example of a cleaner for an image holding member are disposed in a rotating direction of the photosensitive member PR around the photosensitive member PR.

In FIG. 2, a charging roll cleaner CRc according to an example of a cleaner for a charger which cleans a surface of the charging roll CR is disposed opposite to the charging roll CR in contact therewith.

Moreover, the developing device G has a developing container V for accommodating a developer therein. The developing container V includes the developing roll Ga according to an example of a developer holding member which is disposed opposite to the photosensitive member PR, a pair of circulating and delivering members Gb and Gc for circulating and delivering the developer which is being stirred, a supplying member Gd for delivering, to the developing roll Ga, the developer stirred by the circulating and delivering member, and a layer thickness regulating member Ge for regulating a layer thickness of the developer on a surface of the developing roll Ga.

A developer supplying port V1 according to an example of a supplying portion is formed on an upper surface at a front side of the developing container V. A developer supplying path V3 extended forward according to an example of a developer delivering path is coupled to the developer supplying port V1. A supplying auger V4 according to an example of a developer delivering member is rotatably supported in the developer supplying path V3. A cartridge holder KH according to an example of an attached/removed portion to/from which a toner cartridge TC is attached/removed is coupled to a front end of the developer supplying path V3, and the developer flows thereinto from the toner cartridge TC. When the supplying auger V4 is driven depending on a quantity of consumption of the developer in the developing device G, accordingly, the developer is supplied from the toner cartridge TC to the developing device G.

The surface of the rotated photosensitive member PR is charged by the charging roll CR in a charging region Q1, and an electrostatic latent image is formed by a latent image forming light emitted from the latent image forming device LH in a latent image forming position Q2. The electrostatic latent image is developed into a toner image according to an example of a visible image by means of the developing roll Ga in a developing region Q3, and the toner image is transferred onto the recording sheet S according to an example of a medium by means of the transfer roll Tr in a transfer region Q4 formed by a region in which the photosensitive member PR and the transfer roll Tr are opposed to each other. A toner remaining on the surface of the photosensitive member PR is removed by a cleaning blade CB according to an example of a cleaning member in a cleaning region Q5 according to an example of a cleaning region on a downstream side of the transfer region Q4, and is collected into the photosensitive cleaner CL.

A film seal FS according to an example of a scatter preventing member is provided on an opposite side to the cleaning blade CB. The film seal FS prevents the toner collected into the photosensitive cleaner CL from dropping out.

In FIG. 2, a pickup roll Rp according to an example of a medium take-out member is disposed in the paper feeding tray TR1 in the lower part of the printer U. The recording sheets S taken out by the pickup roll Rp are separated one by one by means of a sorting roll Rs having a retard roll and a paper feeding roll according to an example of a medium sorting member and are then delivered along a sheet delivering path SH, and are delivered to the transfer region Q4 in a preset timing by means of a resist roll Rr according to an example of a time adjusting member disposed on an upstream side in a sheet delivering direction of the transfer region Q4.

The transfer roll Tr to which a transfer voltage is applied from the power device E to be operated under control of the controller C transfers a toner image on the photosensitive member PR to the recording sheet S passing through the transfer region Q4.

The recording sheet S to which the toner image is transferred in the transfer region Q4 is delivered to a fixing device F in a state in which the toner image is not fixed. The fixing device F has a pair of fixing rolls Fh and Fp according to an example of a fixing member, and a fixing region Q6 is formed by a pressure contact region of the fixing rolls Fh and Fp. The toner image is fixed onto the recording sheet S delivered to the fixing device F by means of the fixing rolls Fh and Fp in the fixing region Q6. The recording sheet S having the fixed toner image formed thereon is guided by sheet guides SG1 and SG2 according to an example of a medium guiding member, and is discharged to the discharging tray TRh on an upper surface of a printer body U1 from a discharging roll R1 according to an example of a discharging member.

An image recording portion U2 according to the first example is constituted by the latent image forming device LH, the photosensitive member PR, the developing device G and the transfer roll Tr.

Figure 3:
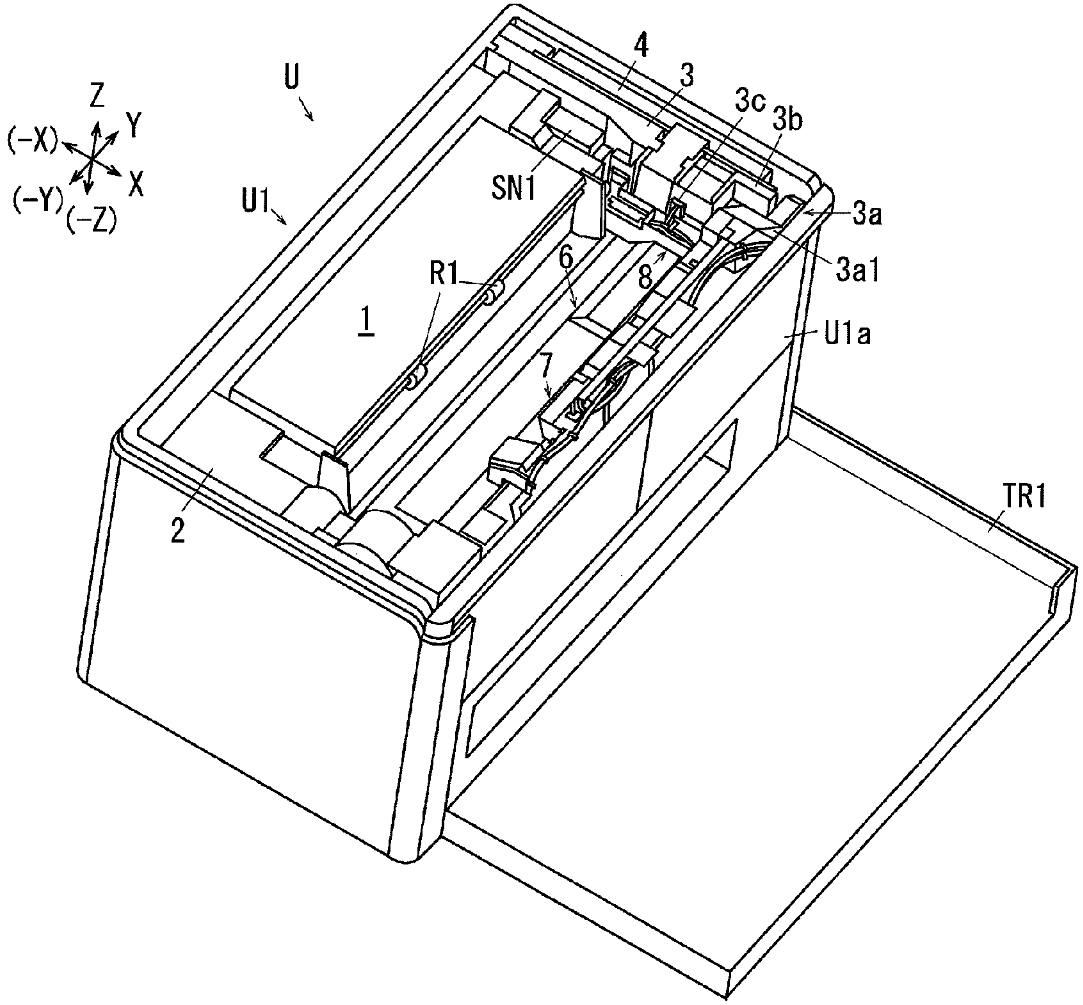
FIG. 3 is a perspective view showing a printer according to the first example with a top cover removed as seen from a left, upper and front part.

FIG. 3 is a perspective view showing the printer according to the first example with a top cover removed as seen from a left, upper and front part.

Figure 4:
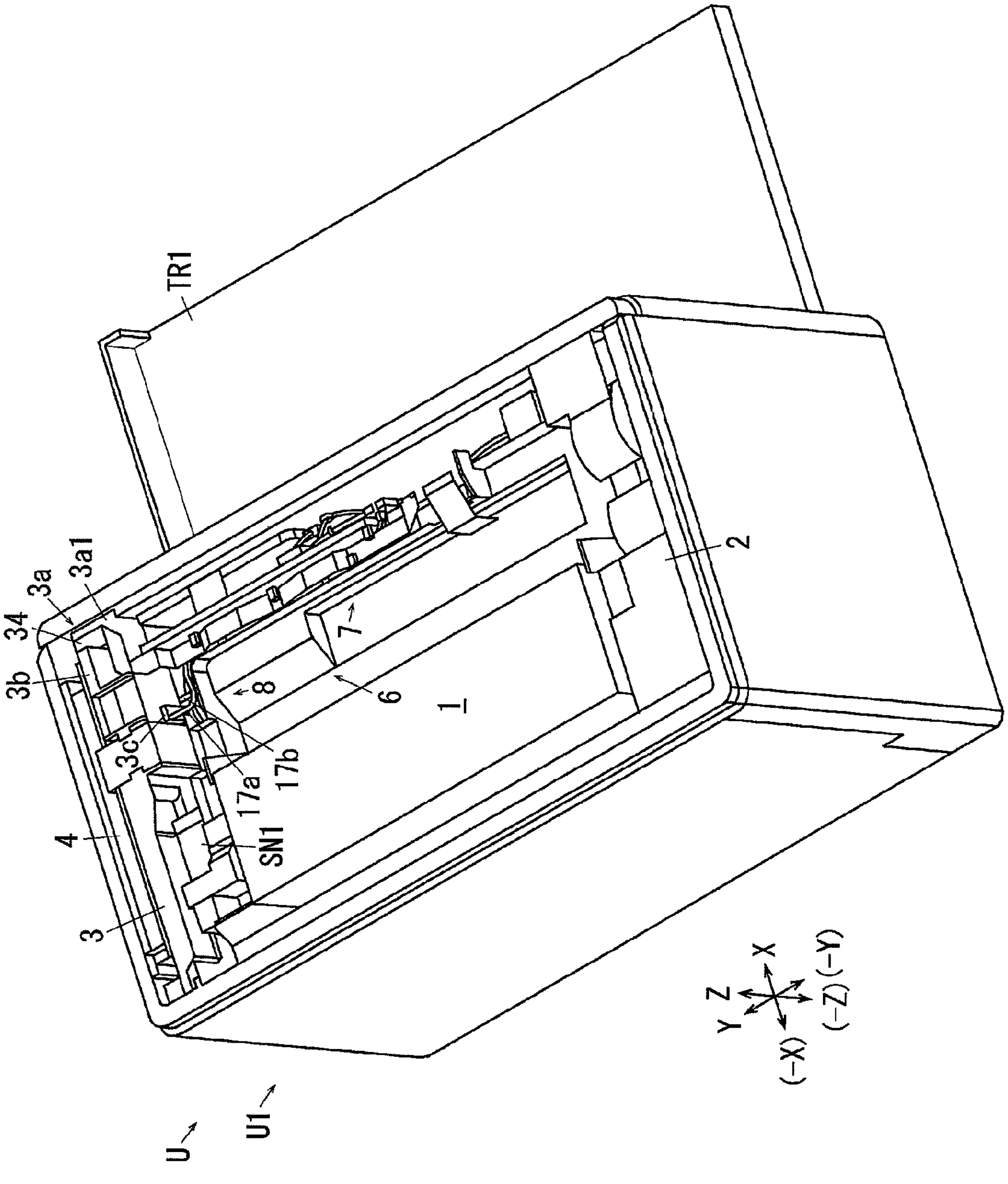
FIG. 4 is a perspective view showing the printer according to the first example with the top cover removed as seen from a left, upper and rear part.

FIG. 4 is a perspective view showing the printer according to the first example with the top cover removed as seen from a left, upper and rear part.

In FIGS. 3 and 4, a discharging support member 1 is supported on an upper part at a rear side of the printer body U1. The discharging support member 1 is extended transversely and has a lower surface on which the sheet guide SG2 is formed. The discharging roll R1 is rotatably supported on a front part of the discharging support member 1.

A driving unit 2 is supported in a leftward part of the discharging support member 1. The driving unit 2 has a driving source and a transmitting member which are not shown, and serves to drive the discharging roll R1, the pick-up roll Rp, the resist roll Rr, the photosensitive member PR and the developing device G.

In FIGS. 3 and 4, a discharging sensor SN1 according to an example of an electronic component, that is, an example of a medium detecting member is supported in a rightward part of the discharging support member 1. The discharging sensor SN1 detects whether or not the recording sheet S delivered through the sheet delivering path SH is discharged to the discharging tray TRh through a moving member to be moved in contact with the recording sheet S, that is, an actuator.

In FIGS. 3 and 4, a right frame 3 according to an example of a plate-shaped right frame member is supported in a rightward part of the discharging sensor SN1. The right frame 3 takes such a shape that a width of a front part is greater than that of a rear part in a transverse direction and the front part is protruded toward a left side.

A laying portion 3*a* taking a downward concave shape is formed on a front end of the right frame 3. An erected wall 3*b* extended upward is formed in a right part of the laying portion 3*a*, and the laying portion 3*a* has a laying surface 3*a*1 extended around the erected wall 3*b* toward a front side, that is, taking a shape of a crank.

A cable through hole 3*c* according to an example of a wiring through hole is formed on a left surface of the right frame 3 in a rear part of the laying portion 3*a*.

A processing board 4 according to an example of a second electronic circuit is supported on a right surface of the right frame 3. The processing board 4 according to the first example has the image processing portion GS and carries out a processing for receiving print information from the external computer PC and converting the print information into an image recording control signal.

Figure 5A:
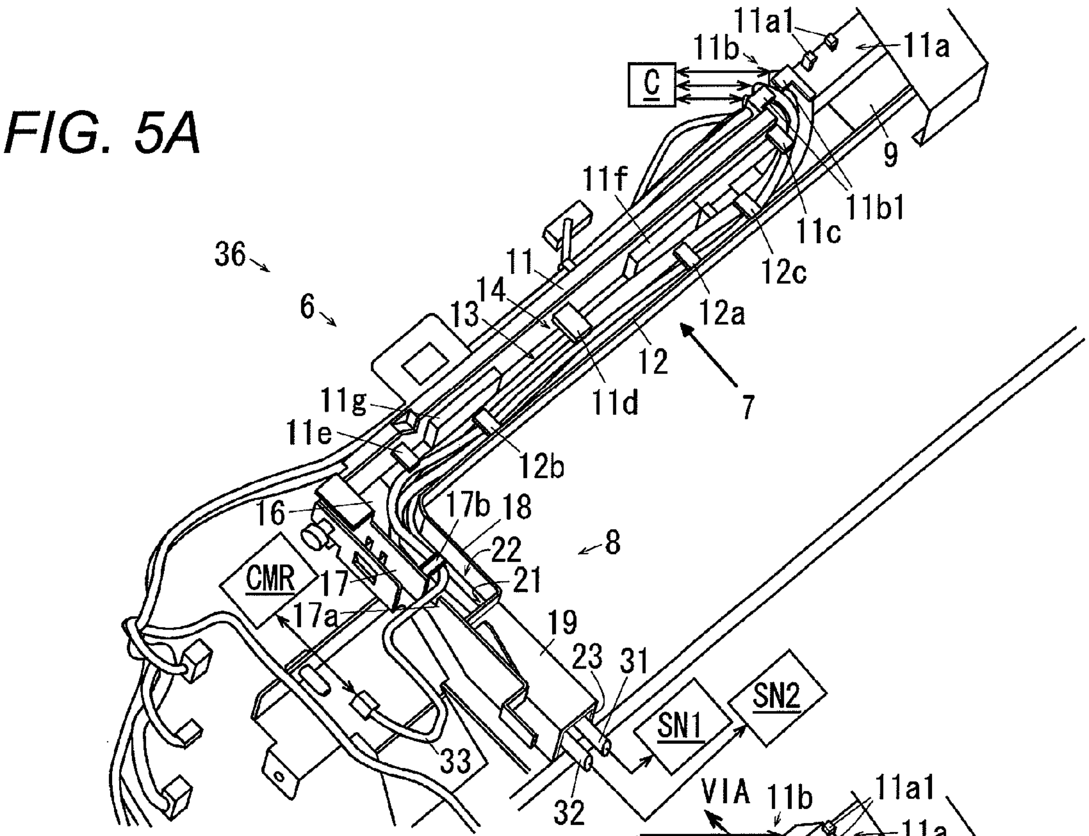
FIGS. 5A and 5B are enlarged views showing a main part of a cable guide, FIG. 5A being an explanatory view showing a state in which a flat cable has not been accommodated and FIG. 5B being an explanatory view showing a state in which the flat cable has been accommodated.
Figure 5B:
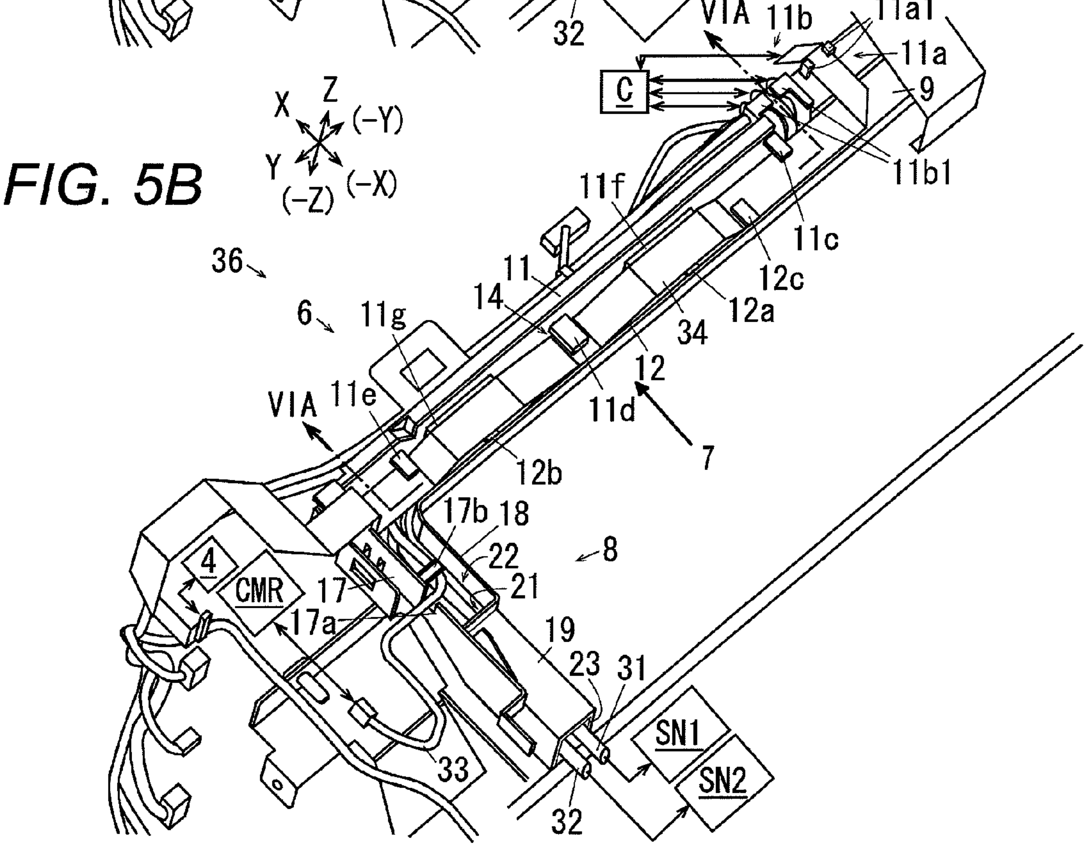

FIG. 5 is an enlarged view showing a main part of a cable guide, and FIG. 5A is an explanatory view showing a state in which a flat cable has not been accommodated and FIG. 5B is an explanatory view showing a state in which the flat cable has been accommodated.

In FIGS. 3 and 4, a cable guide 6 according to an example of a housing portion is supported in a leftward part of the right frame 3 and a forward part of the discharging support member 1. The cable guide 6 has a main guide 7 according to an example of a main housing portion which is extended in a rightward direction from a left part of the printer body U1 toward the right frame 3, and a subguide 8 according to an example of a subhousing portion which is extended from a right end of the main guide 7 toward the discharging sensor SN1 in a rearward direction.

In FIG. 5, the main guide 7 has a planar bottom portion 9 which is extended transversely, a front wall 11 which is extended upward from a front end of the bottom portion 9, and a rear wall 12 which is extended upward from a rear end of the bottom portion 9 and is lower than the front wall 11. A wiring housing space 13 is formed by a space surrounded by the bottom portion 9, the front wall 11 and the rear wall 12. Moreover, an upper part of the wiring housing space 13 is opened and a main side cable attaching/removing port 14 according to an example of an opening on the main housing portion side is formed by an upper side of the front wall 11 and an upper end of the rear wall 12.

In FIGS. 4 and 5A, a flat leading portion 11 a according to an example of a band-shaped wiring leading portion is formed on a left end of the front wall 11. The flat leading portion 11*a* has a smaller height than heights in the other front wall 11 parts. In FIG. 5A, a pair of left and right pressing clicks 11*a*1 is formed on a right part of the flat leading portion 11*a*.

A wire leading portion 11*b* according to an example of a linear wiring leading portion is formed on a right side of the flat leading portion 11*a*. The wire leading portion 11*b* takes a shape penetrating through the front wall 11 forward from the wiring housing space 13. A pair of left and right housing clicks 11*b*1 is formed on an upper part of the wire leading portion 11*b*.

Figures 6A, 6B, 6C:
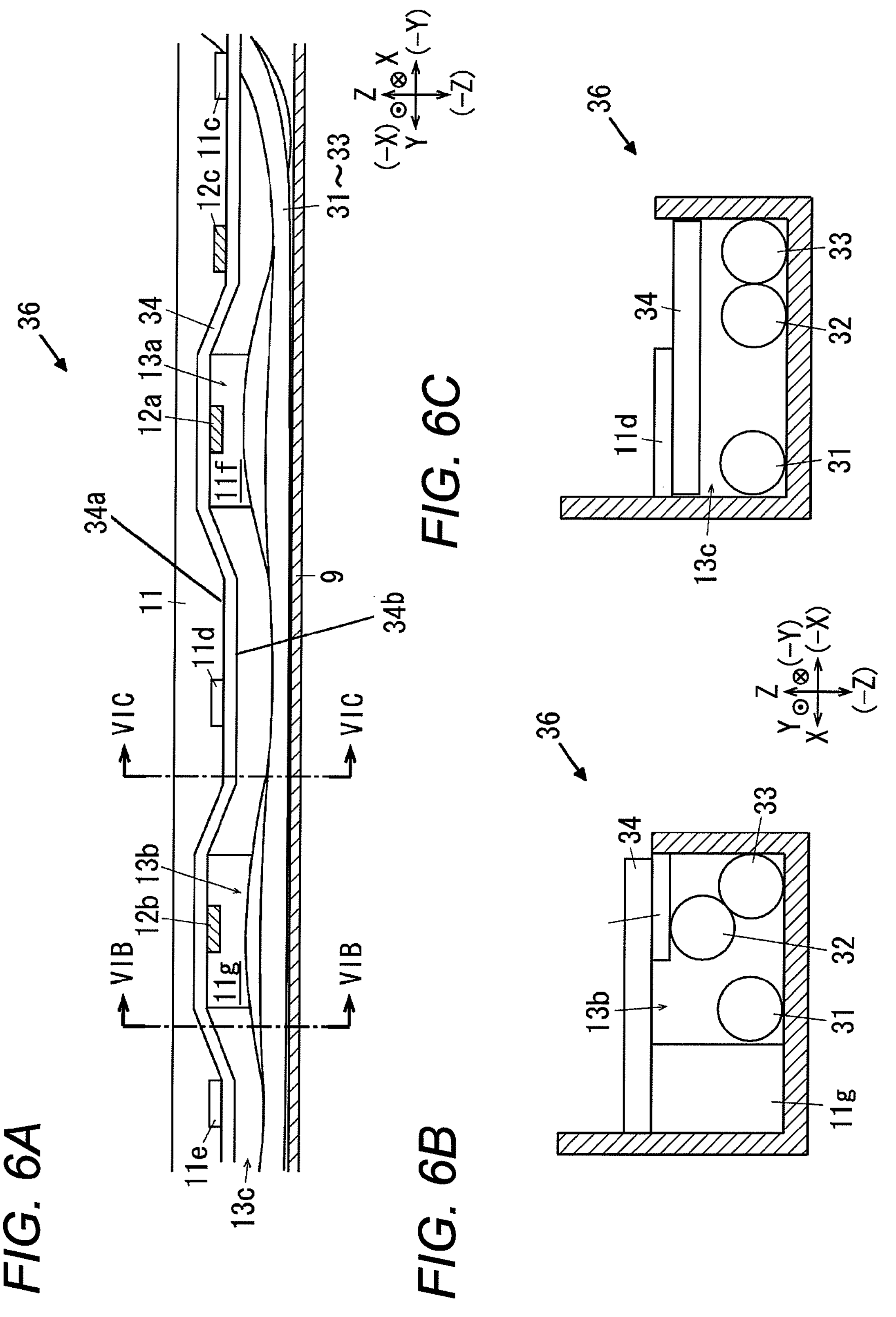
FIGS. 6A, 6B and 6C are sectional views showing the cable guide, FIG. 6A being a sectional view taken along a VIA-VIA line in FIG. 5B, FIG. 6B being a sectional view taken along a VIB-VIB line in FIG. 6A, and FIG. 6C being a sectional view taken along a VIC-VIC line in FIG. 6A.

FIG. 6 is a sectional view showing the cable guide, and FIG. 6A is a sectional view taken along a VIA-VIA line in FIG. 5B, FIG. 6B is a sectional view taken along a VIB-VIB line in FIG. 6A and FIG. 6C is a sectional view taken along a VIC-VIC line in FIG. 6A.

In FIGS. 5A and 6A, a first flat holding click 11*c* according to an example of a first holding portion is formed on a right side of the wire leading portion 11*b*. The first flat holding click 11*c* is protruded in an inward direction of the main side cable attaching/removing port 14. A second flat holding click 11*d* according to an example of a second holding portion and a third flat holding click 11*e* according to an example of a third holding portion are formed on a central part and a right end in the front wall 11 at a right side of the first flat holding click 11*c*, respectively. The second and third flat holding clicks 11*d* and 11*e* are protruded in the inward direction of the main side cable attaching/removing port 14.

Each of the flat holding clicks 11*c* to 11*e* according to the first example is constituted to have the same height as that of the upper end of the rear wall 12.

A first holder fixing portion 11*f* according to an example of a first convex portion taking a shape of a rectangular parallelepiped is formed between the first flat holding click 11*c* and the second flat holding click 11*d*. The first holder fixing portion 11*f* is protruded toward an inside of the wiring housing space 13. Moreover, a second holder fixing portion 11*g* according to an example of a second convex portion is formed between the second flat holding click 11*d* and the third flat holding click 11*e*. The second holder fixing portion 11*g* has the same structure as that of the first holder fixing portion 11*f*.

A first small width portion 13*a* and a second small width portion 13*b* in which a width in a longitudinal direction of the wiring housing space 13 is partially reduced are formed by the holder fixing portions 11*f* and 11*g*, respectively.

The holder fixing portions 11*f* and 11*g* are constituted to have the same heights as the height of the upper end of the rear wall 12. An upper end of the cartridge holder KH is screwed and fixed to each of the holder fixing portions 11*f* and 11*g* from a forward part of the front wall 11.

In FIGS. 5A and 6A, a first wire holding click 12*a* according to an example of a first linear wiring holding portion is formed on the rear wall 12. The first wire holding click 12*a* is protruded from the upper end of the rear wall 12 in the inward direction of the main side cable attaching/removing port 14 in the first small width portion 13*a*. Moreover, a second wire holding click 12*b* according to an example of a second linear wiring holding portion is formed on the rear wall 12. The second wire holding click 12*b* is protruded from the upper end of the rear wall 12 in the same manner as the first wire holding click 12*a* in the second small width portion 13*b*.

The respective wire holding clicks 12*a* and 12*b* are extended forward from the upper end of the rear wall 12 and are constituted to have the same heights as those of the holder fixing portions 11*f* and 11*g*.

A fourth flat holding click 12*c* according to an example of a fourth holding portion is formed on the rear wall 12. The fourth flat holding click 12*c* is protruded from the upper end of the rear wall 12 in the inward direction of the main side cable attaching/removing port 14 between the first wire holding click 12*a* and the first flat holding click 11*c* of the front wall 11. The fourth flat holding click 12*c* is extended forward from the upper end of the rear wall 12 and is constituted to have the same height as that of each of the flat holding clicks 11*c* to 11*e*.

In FIG. 5, the subguide 8 has a planar bottom portion 16 extended from a right end of the bottom portion 9 toward the discharging sensor SN1 side, a right wall 17 extended upward from a right end of the bottom portion 16 and extended from a right end of the front wall 11 toward the discharging sensor SN1 side, a left wall 18 extended upward from a left end of the bottom portion 16 and extended from a right end of the rear wall 12 toward the discharging sensor SN1 side, and a cover portion 19 formed between an upper end of a rear end of the right wall 17 and an upper end of a rear end of the left wall 18.

A wiring housing space 21 on a subhousing portion side is formed by a space surrounded by the bottom portion 16, the right wall 17 and the left wall 18 and a space surrounded by the bottom portion 16, the right wall 17, the left wall 18 and the cover portion 19. Accordingly, a front part of the wiring housing space 21 is opened upward and a rear part of the wiring housing space 21 is closed with the cover portion 19 in an upper part.

A sub side cable attaching/removing port 22 according to an example of an opening on the subhousing portion side is formed by an upper side of a front end of the right wall 17 and an upper end of a front end of the left wall 18. Moreover, a wiring leading hole 23 is formed by a rear end of the bottom portion 16, a rear end of the right wall 17, a rear end of the left wall 18 and a rear end of the cover portion 19. The wiring leading hole 23 is opened toward the discharging sensor SN1 side.

In FIGS. 3 to 5, a notch portion 17*a* is formed on the right wall 17 corresponding to the cable through hole 3*c* of the right frame 3. Moreover, a stopping portion 17*b* protruded toward an inside of the sub side cable attaching/removing port 22 is formed on a front side of the notch portion 17*a*.

The cable guide 6 according to the first example is constituted by the main guide 7 and the sub guide 8.

In other words, a wiring housing space (13+21) of the cable guide 6 is constituted by the wiring housing space 13 and the wiring housing space 21. Moreover, a cable attaching/removing port (14+22) according to an example of an opening of the cable guide 6 is constituted by the main side cable attaching/removing port 14 and the sub side cable attaching/removing port 22.

In FIG. 5, in the printer U according to the first example, the controller C provided on an inner part at the front end side of the printer body U1 and the discharging sensor SN1 are connected to each other through a first wire cable 31 according to an example of a linear wiring. Similarly, the controller C, a temperature sensor SN2 according to an example of the electronic component, that is, an example of a temperature detecting member and a CRUM reader CMR according to an example of the electronic component, that is, an example of an information reading/writing device are also connected through a second wire cable 32 and a third wire cable 33 according to an example of the linear wiring, respectively.

Moreover, the controller C and the processing board 4 are connected to each other through a flat cable 34 according to an example of the band-shaped wiring.

In FIGS. 3 to 6, the wire cables 31 to 33 and the flat cable 34 are held in an accommodating state in the cable guide 6 of the printer body U1. And, the wire cables 31 to 33 and the flat cable 34 are extended in a laying direction which is the Y-axis direction.

In FIGS. 3 to 6, one end side of each of the wire cables 31 to 33 which is connected to the controller C is held by the housing click 11*b*1 in the wire leading portion 11*b* and is guided to the wiring housing space 13 in an inner part from an outside of the cable guide 6.

The wire cables 31 to 33 are held in the wiring housing space (13+21) in a state in which they pass through a lower side of the flat holding clicks 11*c* to 11*e* and 12*c* and the stopping portion 17*b*. As shown in FIGS. 5A, 6A and 6B, moreover, the wire cables 31 to 33 are held in the small width portions 13*a* and 13*b* by means of the wire holding clicks 12*a* and 12*b*.

In FIGS. 3 to 5, the other end side of the first wire cable 31 is led from the wiring leading hole 23 to the outside and is connected to the discharging sensor SN1.

Moreover, the other end side of the second wire cable 32 is led from the wiring leading hole 23 to the outside and is connected to the temperature sensor SN2 provided in the fixing device F. The temperature sensor SN2 serves to detect a temperature of the fixing roll Fh.

Furthermore, the other end side of the third wire cable 33 is led to the outside of the wiring housing space 21 via the notch portion 17*a*. As shown in FIG. 5A, the third wire cable 33 is connected to the CRUM reader CMR supported on the cartridge holder KH via the cable through hole 3*c*. The CRUM reader CMR transmits/receives information to/from a CRUM (Customer Replaceable Unit Memory) according to an example of an information storing member (not shown) which is supported on the toner cartridge TC, and reads/writes information about the toner cartridge TC, for instance, a compatible machine type of the toner cartridge TC or a quantity of a developer remaining on an inner part from/to the CRUM.

In FIGS. 3 to 6, the flat cable 34 has a width which is smaller than that of the cable attaching/removing port 14 and is greater than that of each of the small width portions 13*a* and 13*b*.

One end side of the flat cable 34 which is connected to the controller C is held by the pressing portion 11*a*1 in the flat leading portion 11*a* and is guided from the outside of the cable guide 6 to the wiring housing space 13 in the inner part.

The flat cable 34 is held in the wiring housing space 13 in a state in which an upper surface 34*a* according to an example of a first surface is caught by each of the flat holding clicks 11*c* to 11*e* and 12*c*. As shown in FIGS. 5B, 6A and 6B, moreover, the flat cable 34 is constituted to have the greater width than that of each of the small width portions 13*a* and 13*b* and is held in upper parts of the small width portions 13*a* and 13*b* without entering the small width portions 13*a* and 13*b*.

In other words, in FIG. 6A, the flat cable 34 according to the first example is accommodated zigzag to vertically intersect between the flat holding clicks 11*c* to 11*e* and 12*c* and the holder fixing portions 11*f* and 11*g* of the small width portions 13*a* and 13*b*, and is accommodated in such a manner that the upper surface 34*a* can come in contact with the flat holding clicks 11*c* to 11*e* and 12*c* and a lower surface 34*b* according to an example of a second surface can come in contact with the holder fixing portions 11*f* and 11*g*.

In FIGS. 3 to 5, the other end side of the flat cable 34 is led from the right end of the main side cable attaching/removing port 14 to the outside of the wiring housing space 13 and is guided to the laying portion 3*a* of the right frame 3. Then, the other end side of the flat cable 34 is laid to take a shape of a crank along the laying surface 3*a*1 of the laying portion 3*a* and is connected to the processing board 4 supported on the right side of the right frame 3.

Accordingly, the wire cables 31 to 33 are accommodated and held between the flat cable 34 and the bottom portion 9 of the cable guide 6 in the wiring housing space 13 as shown in FIG. 6.

In other words, when the flat cable 34 is accommodated in the wiring housing space 13 in the cable guide 6 and is held by the flat holding clicks 11*c* to 11*e* and 12*c*, the main side cable attaching/removing port 14 of the wiring housing space 13 is covered with the flat cable 34. Accordingly, a wire holding space 13*c* according to an example of a wire holding space for accommodating the wire cables 31 to 33 therein is formed between the flat cable 34 and the cable guide 6.

A wiring holding member 36 according to the first example is constituted by the cable guide 6, the flat holding clicks 11*c* to 11*e* and 12*c*, the wire holding clicks 12*a* and 12*b*, and the wire holding space 13*c*.

In the printer U according to the first example having the structure described above, when print information is transmitted from the external computer PC, it is converted into an image recording signal in the processing board 4. The image recording signal is transmitted to the controller C through the flat cable 34 held by the wiring holding member 36 and the image recording portion U2 is controlled by the controller C so that an image is recorded on the recording sheet S.

In the printer U according to the first example, moreover, a power is supplied to the electronic components SN1, SN2 and CMR through the wire cables 31 to 33 held by the wiring holding member 36 so that the electronic components SN1, SN2 and CMR are operated. In other words, in the printer U according to the first example, the controller C receives, through the wire cables 31 and 32, information about whether the recording sheet S is discharged or not and information about the temperature of the fixing device F, and transmits/receives information about a quantity of the developer remaining in the toner cartridge TC through the wire cable 33.

With the conventional structure, a holding mechanism corresponding to a flat cable is provided to hold only the flat cable, or a holding mechanism corresponding to a flat cable and a holding mechanism corresponding to a wire cable are provided to hold the flat cable and the wire cable separately. With the conventional structure, therefore, it is necessary to separately provide mechanisms for holding cables of different types when holding the cables.

On the other hand, in the wiring holding member 36 according to the first example, the flat holding clicks 11*c* to 11*e* and 12*c* hold the flat cable 34 in the wiring housing space (13+21) of the cable guide 6 and the main side cable attaching/removing port 14 is covered with the flat cable 34. Accordingly, the wire cables 31 to 33 are held in the wire holding space 13*c* formed between the flat cable 34 and the cable guide 6. In other words, even if the wire holding clicks 12*a* and 12*c* are not provided, the wire cables 31 to 33 are held in the cable guide 6 with the flat cable 34 serving as a cover.

In the first example, therefore, a necessity for providing a mechanism for holding a cable every cable is reduced more greatly as compared with the conventional structure. Consequently, it is possible to hold a plurality of wirings with a simple structure.

In the first example, moreover, the cable guide 6 is provided with the small width portions 13*a* and 13*b*. The flat cable 34 having the greater width than the widths of the small width portions 13*a* and 13*b* is held beyond the small width portions 13*a* and 13*b* without entering the small width portions 13*a* and 13*b*. In other words, the flat cable 34 is accommodated zigzag in a vertically wavy way between the flat holding clicks 11*c* to 11*e* and 12*c* and the holder fixing portions 11*f* and 11*g* of the small width portions 13*a* and 13*b*. Accordingly, the flat cable 34 is held in such a manner that the upper surface 34*a* can come in contact with the flat holding clicks 11*c* to 11*e* and 12*c*, and the lower surface 34*b* can come in contact with the holder fixing portions 11*f* and 11*g*. The wire holding clicks 12*a* and 12*b* have contact portions which come in contact with the flat cable 34, and apply a bending force so that the flat cable 34 is bent in a zigzag manner between the flat holding clicks 11*c* to 11*e* and 12*c* and the holder fixing portions 11*f* and 11*g* of the small width portions 13*a* and 13*b*.

As compared with the case in which the flat cable 34 is not accommodated zigzag in the vertically wavy way between the flat holding clicks 11*c* to 11*e* and 12*c* and the holder fixing portions 11*f* and 11*g*, therefore, the number of places in which the flat cable 34 and the cable guide 6 can come in contact with each other is increased more greatly so that the flat cable 34 can be held more reliably.

In the first example, furthermore, the wire holding clicks 12*a* and 12*b* are provided in the small width portions 13*a* and 13*b* of the cable guide 6, and the wire cables 31 to 33 are held.

In some cases in which the wire holding clicks 12*a* and 12*b* are not provided, the wire cables 31 to 33 having a rigidity slip out of the wiring housing space 13 through the cable attaching/removing port (14+22) in an attachment.

On the other hand, in the wiring holding member 36 according to the first example, the wire cables 31 to 33 are held in the small width portions 13*a* and 13*b* of the wiring housing space 13 through the wire holding clicks 12*a* and 12*b* and are finally held in the wire holding space 13*c* formed by the flat cable 34. In other words, the wire cables 31 to 33 are temporarily fixed into the wiring housing space 13 through the wire holding clicks 12*a* and 12*b*, and there is reduced a necessity for an operator to hold the wire cables 31 to 33 in the cable guide 6 when attaching the flat cable 34. In the first example, accordingly, a workability in the attachment of the flat cable 34 can be enhanced more greatly as compared with a structure in which the wire holding clicks 12*a* and 12*b* are not provided.

With the structure according to the first example in which the wire cables 31 to 33 are held in the wire holding space 13*c*, the wire cables 31 to 33 are only caused to pass through the cable attaching/removing port (14+22) between the flat holding clicks 11*c* to 11*e* and 12*c* and the wire holding clicks 12*a* and 12*b* so that the attachment is ended. Accordingly, as compared with the case in which the wire cables 31 to 33 are bundled by means of a bundling member, that is, a binding band or are fixed and held by a holding mechanism, for instance, a workability in the attachment of the wire cables 31 to 33 can be enhanced more greatly.

Moreover, the wire cables 31 to 33 according to the first example are held in the wire holding space 13*c* and the wire holding clicks 12*a* and 12*b* with a clearance after the flat cable 34 is attached to the cable guide 6. Accordingly, as compared with the case in which the wire cables 31 to 33 are bundled by means of a binding band or are fixed and held by a holding mechanism, for instance, a load, that is, a stress applied to the wire cables 31 to 33 can be reduced more greatly.

Figures 7A, 7B, 7C:
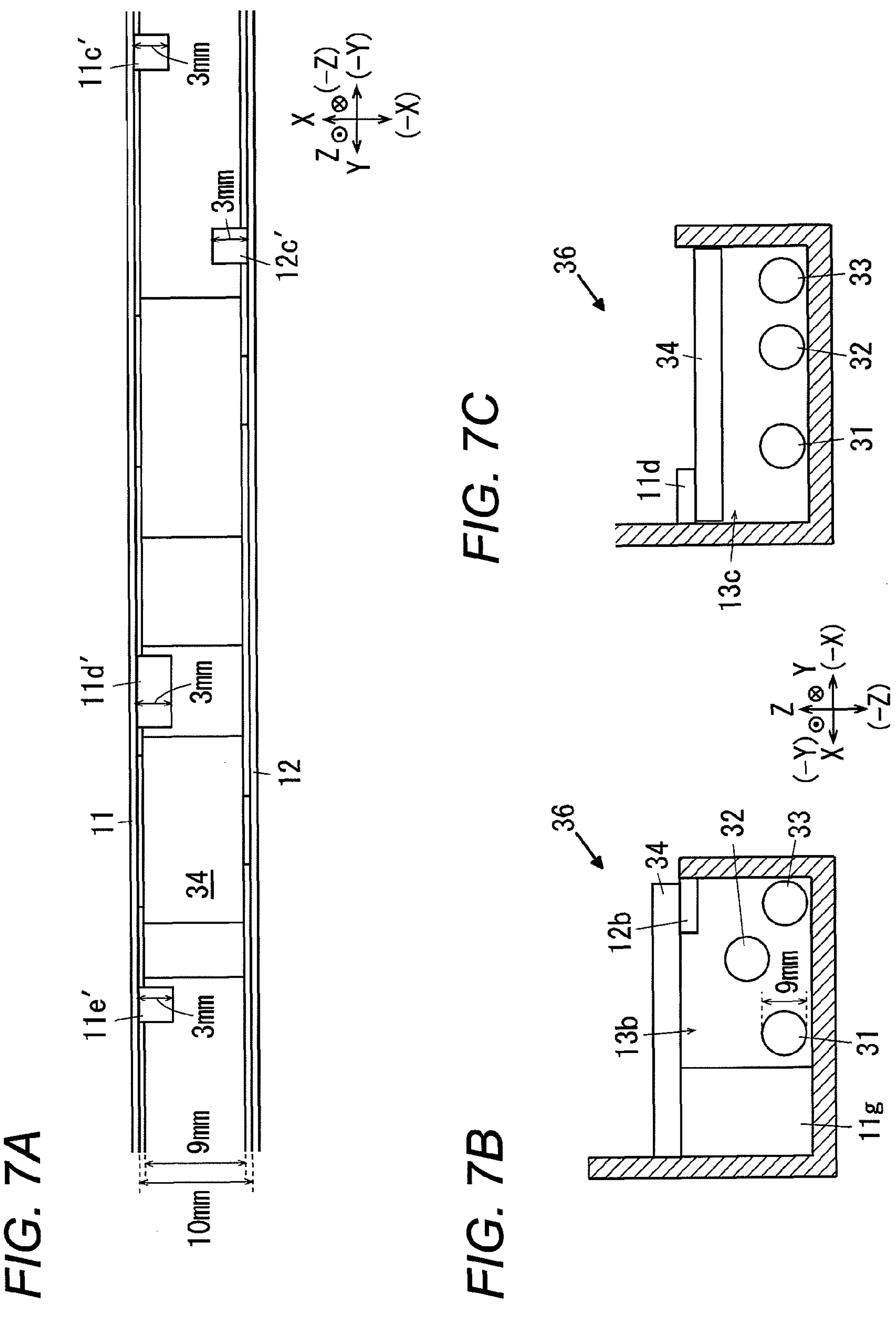
FIGS. 7A, 7B and 7C are explanatory views showing a cable guide according to a second example, FIG. 7A being an enlarged view showing a main part of the cable guide seen from above, FIG. 7B being a view corresponding to FIG. 6B, and FIG. 7C being a view corresponding to FIG. 6C.

FIG. 7 is an explanatory view showing a cable guide according to a second example, and FIG. 7A is an enlarged view showing a main part of the cable guide as seen from above, FIG. 7B is a view corresponding to FIG. 6B and FIG. 7C is a view corresponding to FIG. 6C.

Next, the second example according to the invention will be described. In the description of the second example, components corresponding to the components in the first example have the same reference numerals and detailed description thereof will be omitted.

Although the example is different from the first example in the following respects, it is constituted in the same manner as the first example in respect of the other points.

In FIG. 7, flat holding clicks 11*c*' to 11*e*' and 12*c*' according to an example of a holding portion are formed on a wiring holding member 36 according to the second example in place of the flat holding clicks 11*c* to 11*e* and 12*c* according to the first example.

The flat holding clicks 11*c*' to 11*e*' and 12*c*' according to the second example are protruded in an inward direction of a cable attaching/removing port (14+22) and are formed so as not to get beyond a central part in a transverse direction.

In the second example, a width in a longitudinal direction of the cable attaching/removing port (14+22) is set to be 10 mm. Moreover, lengths in a longitudinal direction of the flat holding clicks 11*c*' to 11*e*' and 12*c*' are set to be 3 mm. Furthermore, a width in a longitudinal direction of a flat cable 34 is set to be 9 mm. A wire cable has a diameter set to be 0.9 mm.

In a printer U according to the second example which has the structure described above, the flat cable 34 is held by the flat holding clicks 11*c*' to 11*e*' and 12*c*' so that a wire holding space 13*c* is formed. In the same manner as in the first example, accordingly, a plurality of wirings is held with a simple structure.

In the wiring holding member 36 according to the second example, moreover, the lengths of the flat holding clicks 11*c*' to 11e' and 12c' are set to be smaller than those in the first example. Therefore, the width of the cable attaching/removing port (14+22) is greater in parts provided with the flat holding clicks 11c' to 11e' and 12c' than that in the first example. In other words, in the second example, a workability in an attachment of wire cables 31 to 33 and the flat cable 34 can be enhanced more greatly than that in the first example.

Figure 8:
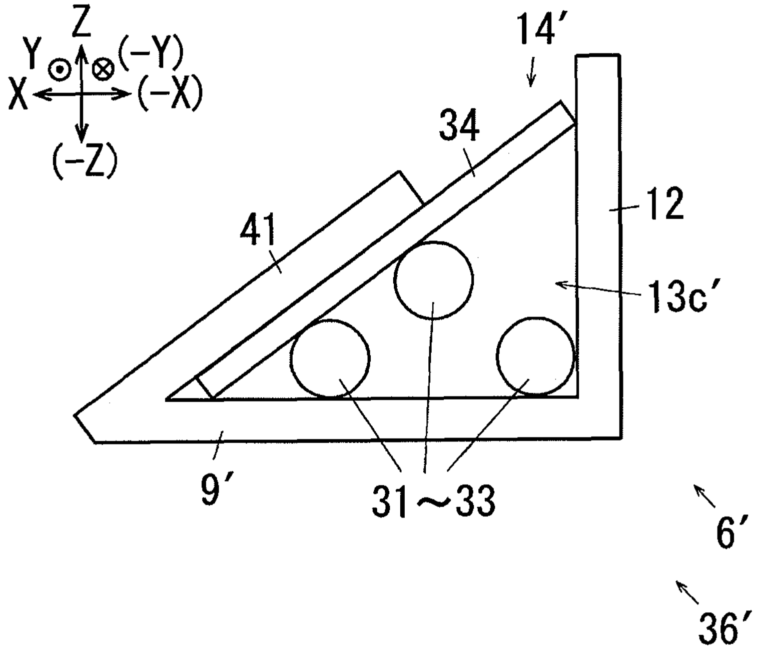
FIG. 8 is a sectional view showing a cable guide according to a third example.

FIG. 8 is a sectional view showing a cable guide according to a third example.

Next, the third example according to the invention will be described. In the description of the third example, components corresponding to the components in the first example have the same reference numerals and detailed description thereof will be omitted.

Although the example is different from the first example in the following respects, it is constituted in the same manner as the first example in respect of the other points.

In FIG. 8, a wiring holding member 36' according to the third example has a cable guide 6' according to an example of a housing portion in place of the cable guide 6 according to the first example.

In FIG. 8, a flat holding click 12c of a rear wall 12 is omitted from the cable guide 6' according to the third example. Moreover, the cable guide 6' according to the third example includes a bottom portion 9' having a smaller width in a longitudinal direction than a width of a flat cable 34.

In the third example, moreover, a flat holding click 41 according to an example of a holding portion is formed on a front end of the bottom portion 9' in place of a front wall 11 and flat holding clicks 11c to 11e. The flat holding click 41 is extended toward the rear wall 12 obliquely and upward. In the third example, a main side cable attaching/removing port 14' according to an example of an opening is formed between the flat holding click 41 and the rear wall 12, and the flat holding click 41 is extended in an inward direction of the main side cable attaching/removing port 14'.

In a printer U according to the third example which has the structure described above, the flat cable 34 is supported in a state in which a front end in a transverse direction is caught on the flat holding click 41 and is held in a state in which a rear end in the transverse direction is disposed in contact with the rear wall 12. Accordingly, the flat cable 34 is held in a leaning state in the cable guide 6' and the main side cable attaching/removing port 14' is covered with the flat cable 34. A wire holding space 13c' is formed between the flat cable 34 and the cable guide 6' and wire cables 31 to 33 are accommodated therein.

In other words, also in the wiring holding member 36' according to the third example, a plurality of wirings is held with a simple structure in the same manner as in the first example.

Figure 9:
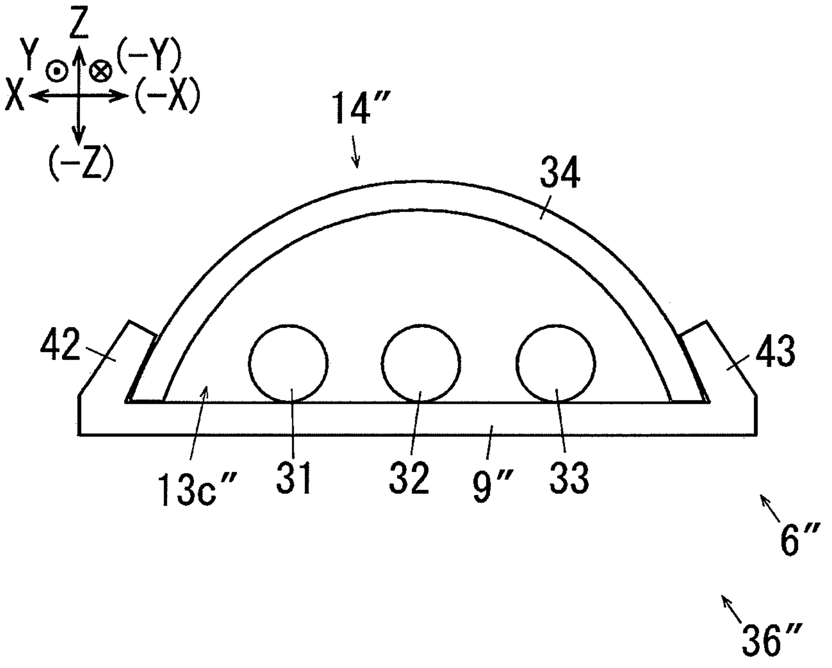
FIG. 9 is a sectional view showing a cable guide according to a fourth example.

FIG. 9 is a sectional view showing a cable guide according to a fourth example.

Next, the fourth example according to the invention will be described. In the description of the fourth example, components corresponding to the components in the first example have the same reference numerals and detailed description thereof will be omitted.

Although the example is different from the first example in the following respects, it is constituted in the same manner as the first example in respect of the other points.

In FIG. 9, a wiring holding member 36" according to the fourth example has a cable guide 6" according to an example of a housing portion in place of the cable guide 6 according to the first example.

In FIG. 9, a front wall 11 and a rear wall 12 are omitted from the cable guide 6" according to the fourth example. Moreover, the cable guide 6" according to the fourth example includes a bottom portion 9" having a smaller width in a longitudinal direction than a width of a flat cable 34.

Flat holding clicks 42 and 43 according to an example of a holding portion are formed on a front end and a rear end in the bottom portion 9". The flat holding clicks 42 and 43 are extended with an oblique and upward tilt toward an inside each other. In the fourth example, a main side cable attaching/removing port 14" according to an example of an opening is formed above the bottom portion 9". The main side cable attaching/removing port 14" is constituted by a space between upper ends of the flat holding clicks 42 and 43.

In a printer U according to the fourth example which has the structure described above, the flat cable 34 is supported in a state in which both ends in a transverse direction are caught on the flat holding clicks 42 and 43 and is held in a state in which the flat cable 34 is curved to take an upward convex shape. Accordingly, the main side cable attaching/removing port 14" is covered with the flat cable 34. A wire holding space 13" is formed between the flat cable 34 and the cable guide 6", that is, between the curved flat cable 34 and the bottom portion 9", and wire cables 31 to 33 are accommodated therein.

In other words, also in the wiring holding member 36" according to the fourth example, a plurality of wirings is held with a simple structure in the same manner as in the first example.

Figures 10A, 10B, 10C, 10D:
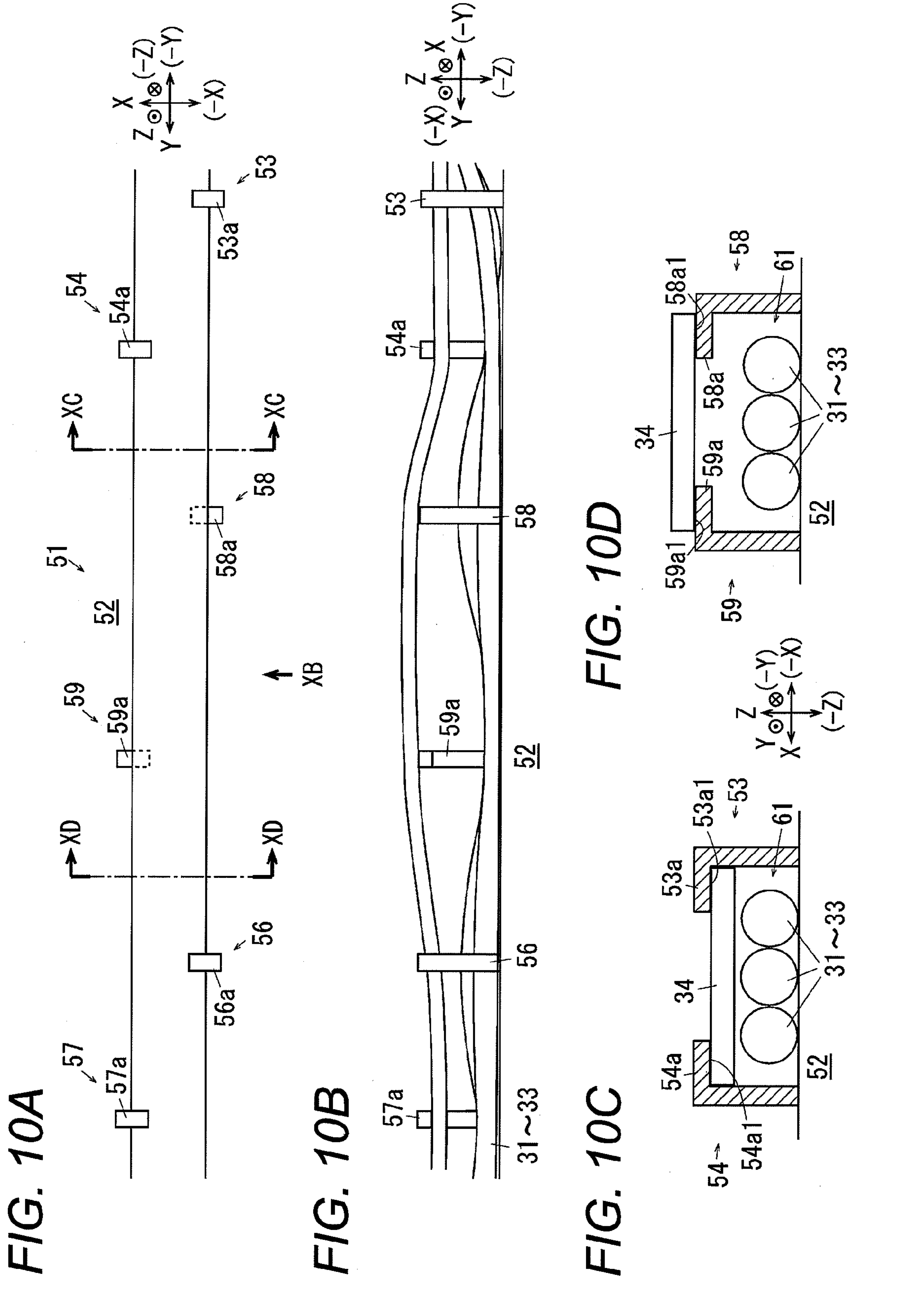
FIGS. 10A, 10B, 10C and 10D are explanatory views showing a wiring holding member according to a fifth example, FIG. 10A being a view seen from an upper side, FIG. 10B being a view seen in a direction of an arrow XB in FIG. 10A, FIG. 10C being a sectional view taken along an XC-XC line in FIG. 10A, and FIG. 10D being a sectional view taken along an XD-XD line in FIG. 10A.

FIG. 10 is an explanatory view showing a wiring holding member according to a fifth example, and FIG. 10A is a view seen from an upper side, FIG. 10B is a view seen in a direction of an arrow XB in FIG. 10A, FIG. 10C is a sectional view taken along an XC-XC line in FIG. 10A, and FIG. 10D is a sectional view taken along an XD-XD line in FIG. 10A.

Next, the fifth example according to the invention will be described. In the description of the fifth example, components corresponding to the components in the first example have the same reference numerals and detailed description thereof will be omitted.

Although the example is different from the first example in the following respects, it is constituted in the same manner as the first example in respect of the other points.

In FIG. 10, a main guide 7 of a cable guide 6 is omitted in a wiring holding member 51 according to the fifth example.

The wiring holding member 51 according to the fifth example has a laying surface 52 where wirings 31 to 34 are provided, flat holding projections 53, 54, 56 and 57 according to an example of a holding portion formed with a protrusion from the laying surface 52, and wire holding projections 58 and 59 according to an example of a linear wiring holding portion.

The respective holding projections 53 to 59 are disposed apart from each other in a longitudinal direction depending on a width of the flat cable 34. Moreover, the holding projections 53 to 59 are disposed at a preset interval in a laying direction in which the wirings 31 to 34 are extended, and the wire holding projections 58 and 59 are provided between the flat holding projections 53 and 54 disposed on a left side and the flat holding projections 56 and 57 disposed on a right side in the laying direction.

Click portions 53a to 59a are formed on tips of the holding projections 53 to 59. The click portions 53a to 59a are extended in such a direction as to interpose the wirings 31 to 34 therebetween. Referring to the wire holding projections 56 and 57, contact portions 58a1 and 59a1 are formed on the click portions 58a and 59a. The contact portions 58a1 and 59a1 can come in contact with the flat cable 34 to apply a bending force. In the fifth example, referring to the flat holding projections 53 to 57, contact portions 53*a*1 to 57*a*1 for a holding portion are formed under the click portions 53*a* to 57*a*. The contact portions 53*a*1 to 57*a*1 can come in contact with the flat cable 34.

In a printer U according to the fifth example having the structure described above, when the flat cable 34 is held by the click portions 53*a* to 57*a* of the flat holding projections 53 to 57, parts between the click portions 53*a* to 59*a* of the holding projections 53 to 59 are blocked.

As shown in FIGS. 10C and 10D, accordingly, the wire cables 31 to 33 according to the fifth example are surrounded by the holding projections 53 to 59 and the flat cable 34 so that the wire cables 31 to 33 can be prevented from being removed toward an outside. In other words, in the fifth example, a wire holding space 61 according to an example of a wiring holding space is constituted by the holding projections 53 to 59 and the flat cable 34, and the wire cables 31 to 33 are accommodated in the wire holding space 61.

In the fifth example, therefore, the wire holding space 61 is formed with the structure including the planar laying surface 52 and the holding projections 53 to 59 protruded from the laying surface 52 differently from a sectional concave shape of the main guide 7 according to the first example. In the same manner as in the first example, a plurality of wirings 31 to 34 is held with a simple structure.

In the fifth example, the flat cable 34 is laid in a state in which it comes in contact with the wire holding projections 58 and 59 over the click portions 58*a* and 59*a* and comes in contact with the flat holding projections 53 to 57 under the click portions 53*a* to 57*a*. In the fifth example, the contact portions 58*a*1 to 59*a*1 of the wire holding projections 58 and 59 are disposed in contact with the flat cable 34 to apply the bending force, and the flat cable 34 is held in a wavy state. As compared with the case in which they are not disposed in contact with the flat cable 34 to apply the bending force, therefore, the flat cable 34 comes in contact with the contact portions 58*a*1 and 59*a*1 and the contact portions 53*a*1 to 57*a*1 for a holding portion more strongly so that a frictional force is increased more greatly and the flat cable 34 is removed with more difficulty.

Although the examples according to the invention have been described above in detail, the invention is not restricted to the examples but various changes can be made without departing from the scope of the invention described in the claims. Variants (H01) to (H016) according to the invention will be described below.

(H01) Although the printer U has been illustrated as an example of the image forming apparatus in each of the examples, the invention is not restricted thereto but can be applied to a copying machine, a FAX or a composite machine having a plurality of functions. Moreover, the invention is not restricted to an image forming apparatus of an electrophotographic type but can be applied to an image forming apparatus of an optional image forming type, for instance, a printing machine of an ink jet recording type, a thermal head type or a lithographic type. Moreover, the invention is not restricted to a monochromatic developing image forming apparatus but can also be constituted by a so-called multicolor image forming apparatus.

(H02) Although the printer U has been illustrated as an example of the electronic device in each of the examples, the invention is not restricted thereto. For instance, the structure according to the invention can be applied to an electronic device in which an electronic component and an electronic circuit are connected to each other through a flat cable and a wire cable such as a game machine according to an example of an electronic play machine, a computer according to an example of an information processing unit, or a hard disk recorder or an optical disk recorder according to an example of an image recording apparatus.

(H03) Although there has been illustrated the structure in which the flat cable 34 is disposed above the wire cables 31 to 33 in each of the examples, the invention is not restricted thereto but it is possible to employ a structure in which the flat cable 34 is disposed in an optional direction, for instance, a downward direction, a transverse direction or a longitudinal direction. In other words, although there has been illustrated the structure in which the openings of the cable guides 6 to 6", that is, the main side cable attaching/removing ports 14 to 14" are disposed above the bottom portions 9 to 9" in a direction of a gravity in the first to fourth examples, the invention is not restricted thereto. For instance, it is possible to employ a structure in which the main side cable attaching/removing ports 14 to 14" are disposed in an optional direction with respect to the bottom portions 9 to 9" such as a structure in which the main side cable attaching/removing ports 14 to 14" are disposed below the bottom portions 9 to 9" in the direction of the gravity or a structure in which they are disposed in a horizontal direction with respect to the bottom portions 9 to 9". In the fifth example, moreover, the invention is not restricted to the laying surface 52 on the upper side but it is possible to employ a structure in which a holding portion is formed to hold the flat cable 34 and the wire cables 31 to 33 over a laying surface in an optional position, for instance, on a lower side, a front side or a right side.

(H04) Although the small width portions 13*a* and 13*b* are formed in the first to fourth examples, it is also possible to employ a structure in which the small width portions 13*a* and 13*b* are omitted.

(H05) Although it is desirable that the wire holding clicks 13*a* and 13*b* and the wire holding projections 58 and 59 according to an example of the linear wiring holding portion should be formed in each of the examples, it is also possible to employ a structure in which the wire holding clicks 13*a* and 13*b* and the wire holding projections 58 and 59 are omitted.

(H06) Although there has been illustrated the structure in which the single flat cable 34 is accommodated in the wiring holding members 36 to 36" and 51 in each of the examples, it is also possible to employ a structure in which a plurality of flat cables is accommodated, for instance, the flat cables are stacked and accommodated. The number of the wire cables 31 to 33 accommodated in the wire holding spaces 13*c* to 13*c*" is not restricted to be three but it is possible to employ a structure in which two wire cables or less or four wire cables or more are accommodated.

(H07) Although there has been illustrated the structure in which the wire cables 31 to 33 held in the wire holding spaces 13*c* to 13*c*" and 61 are connected to the discharging sensor SN1, the temperature sensor SN2 and the CRUM reader CMR according to an example of the electronic component in each of the examples, the invention is not restricted thereto. For instance, it is possible to hold, in a wire holding space, a wire cable connected to an optional electronic component to be electrically operated such as other sensors or a motor, and to hold a wire-shaped feeding cable or a cable for carrying out a transmission/receipt in the wire holding space.

While the wire cables 31 to 33 connected to the discharging sensor SN1, the temperature sensor SN2 and the CRUM reader CMR illustrated in each of the examples have a quantity of generation of a so-called noise which is small, it is possible to use a wire cable or a flat cable which has an electromagnetic shielding function, that is, a shielding function if the noise cannot be disregarded due to a characteristic of the electronic component to be connected.

(H08) Although it is desirable to employ the structure in which the wire holding clicks 12*a* and 12*b* are protruded from the upper end of the rear wall 12 to hold the wire cables 31 to 33 with a clearance formed in the first to fourth examples, the invention is not restricted thereto. It is also possible to employ a structure in which they are extended from a central part in a vertical direction of the rear wall 12 toward the front wall 11, for instance.

(H09) Although there has been illustrated the structure in which the wire holding clicks 12*a* and 12*b* are provided in the small width portions 13*a* and 13*b* in the first to fourth examples, the invention is not restricted thereto but it is possible to employ a structure in which they are provided in optional places of the cable guide 6.

(H010) Although there has been illustrated the structure in which the control portion C according to an example of the first electronic circuit and the processing board 4 according to an example of the second electronic circuit are provided on the separate substrates in each of the examples, the invention is not restricted thereto. For instance, it is also possible to apply the structure according to the invention to a structure in which the first electronic circuit and the second electronic circuit are incorporated into a single substrate or a structure in which a part of the first electronic circuit and the second electronic circuit is incorporated across a plurality of substrates. Moreover, it is also possible to apply the structure according to the invention to a structure in which a part of the first electronic circuit and the second electronic circuit is shared. In other words, the number of the electronic circuits and the structures are not restricted to be two but the structure according to the invention can be applied by setting an optional circuit part of an electronic circuit as the first electronic circuit and the second electronic circuit.

(H011) Although the structure including the holding clicks 11*c* to 11*e* and 12*a* to 12*c* and the holding projections 53 to 59 has been illustrated as an example of the structure of the holding portion or the linear wiring holding portion in the first to fifth examples, the structure of the holding portion or the linear wiring holding portion is not restricted to the modes according to the first to fifth examples. In other words, the number, height, shape and direction of the holding portion or the linear wiring holding portion can be set to be optional as long as the flat cable 34 is held in the holding portion and the wiring holding space for preventing the wire cables 31 to 33 from being removed is formed.

The fifth example will be taken for an illustration. Although there has been illustrated the structure in which the six holding projections 53 to 59 having the same shape are disposed longitudinally and alternately in the laying direction as an example of the holding portion and the linear wiring holding portion in the fifth example, the invention is not restricted to the structure. For instance, it is possible to employ a structure in which both of the two holding projections 53 and 54 on the left side are disposed on a front side of the flat cable 34 and the click portions 53*a* and 54*a* are turned toward a rear side. Moreover, it is possible to decrease the number of the flat holding projections to be three or to further provide the wire holding projection on both sides of the holding projections 53 to 59. In addition, it is possible to cause a part of the respective holding projections 53 to 59 to take a shape of a plate having a great width in the laying direction or to cause the click portion 54*a* to take a shape of a hook. Moreover, it is also possible to employ a structure in which the heights of the holding projections 53 to 59 are varied respectively. Furthermore, it is possible to dispose the holding projections 53 to 59 at an optional interval, respectively.

(H012) Although there has been illustrated the structure in which the flat cable 34 is held in the holding portion in each of the examples, the flat cable 34 does not need to be wholly held by the holding portion according to the invention in the laying direction. In other words, it is sufficient that a part of the flat cable 34 is held by the holding portion according to the invention, and the other part of the flat cable 34 may be held and supported by the member other than the holding portion according to the invention.

(H013) Although there has been illustrated the structure in which the flat cable 34 is laid linearly in each of the examples, the invention is not restricted thereto but it is also possible to employ a structure in which the flat cable 34 is provided with a part bent and the laying direction changed.

(H014) Although there has been illustrated the structure in which the wire holding projections 58 and 59 are disposed corresponding to the width of the flat cable 34 in the fifth example, the invention is not restricted thereto but the wire holding clicks 58 and 59 can also be disposed with smaller widths than the width of the flat cable 34.

(H015) Although it is desirable that the flat cable 34 should be always provided in contact with all of the holding portions in the examples, the invention is not restricted thereto. For instance, also in a state in which the flat cable 34 is held in a loose condition and is provided apart from the holding portion, it is preferable that the flat cable 34 should come in contact with the holding portion to prevent the wire cables 31 to 33 from being removed if the wire cables 31 to 33 are to be removed. In this case, although it is desirable to employ a structure in which a closed wiring holding space is formed by each of the holding portions in the wiring holding member and the flat cable 34 in the holding portion, the invention is not restricted thereto but it is possible to employ a structure in which the closed wiring holding space is formed by the flat cable 34 and the whole wiring holding member as in the fifth example, for instance.

(H016) Although it is desirable to employ a structure in which the wiring holding space is formed in a closing condition by the flat cable 34 and the whole wiring holding member in the examples, the invention is not restricted thereto. For instance, also in the case in which the flat cable 34 is movable in a transverse direction in a holding state in the holding portion and a clearance is formed between the flat cable 34 and the holding portion so that the wiring holding space is not brought into a closing condition, it is preferable to maintain a state in which a diameter is larger than the clearance and the wire cables 31 to 33 cannot be removed from the clearance and are thus accommodated in the wiring holding space.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A wiring holding member for holding a plurality of wirings including a linear wiring and a band-shaped wiring having an upper surface and a lower surface comprising:

a rear wall and a front wall, the rear wall being connected to the front wall by a bottom wall, the front wall, the rear wall, and the bottom wall are configured to form an opening between the front wall, the rear wall, and the bottom wall, and a holding click that protrudes towards an inside of the opening, from at least one of the front wall and the rear wall, and contacts the upper surface of the band-shaped wiring and a holder fixing portion that contacts the lower surface of the band-shaped wiring, wherein a bending force is applied to the band-shaped wiring such that the band-shaped wiring is zigzagged between the holding click and the holder fixing portion, and wherein the band-shaped wiring is configured to block the opening to prevent the linear wiring from being removed from the wiring holding member.

2. A wiring holding member for holding a plurality of wirings including a linear wiring and a band-shaped wiring having an upper surface and a lower surface comprising:

a housing portion having a front wall and rear wall, the front wall and the rear wall being connected by a bottom wall, at least one first holding click protruding from the rear wall and a holder fixing portion protruding towards the inside of the housing portion, from at least one of the front wall and the rear wall, forming a small width portion of the housing portion, at least one second holding click protruding from the front wall, wherein the linear wiring is held in the housing portion by passing through the at least one first holding click and into the small width portion of the housing portion, and wherein the band-shaped wiring has a width which is greater than a width of the small width portion such that the lower surface of the band-shaped wiring contacts the holder portion without entering the small width portion and the upper surface of the band shaped wiring is caught by the at least one second holding clicks, wherein the small width portion are formed in the housing portion by the at least one first holder click and the at least one second holder click and has a reduced width as compared with a non-small width portion of the housing portion.

* * * * *